(No Model.)  3 Sheets—Sheet 1.
L. FEINGOLD.
ATTACHMENT FOR BICYCLES.
No. 603,326.  Patented May 3, 1898.
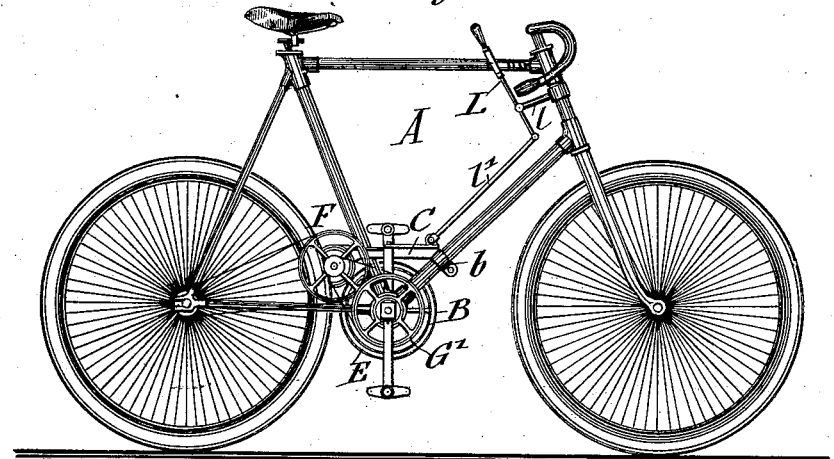
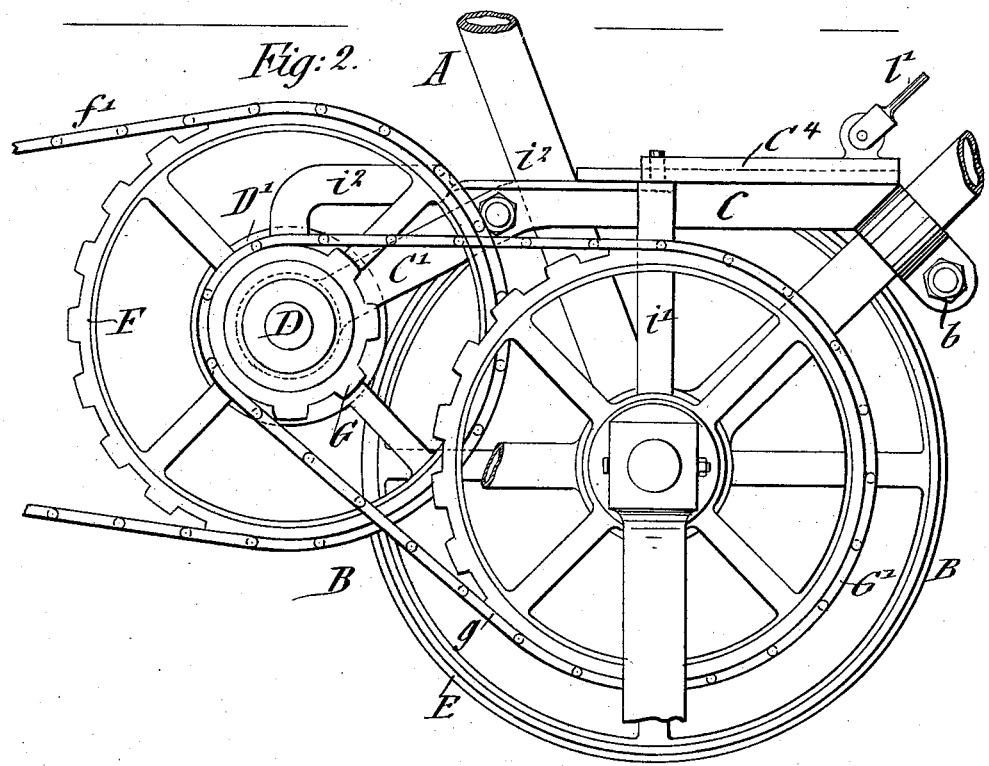
WITNESSES:
Carl Kaelble.
Hulda Posnansky.
INVENTOR
Louis Feingold
BY
Edm. Posnansky
ATTORNEY

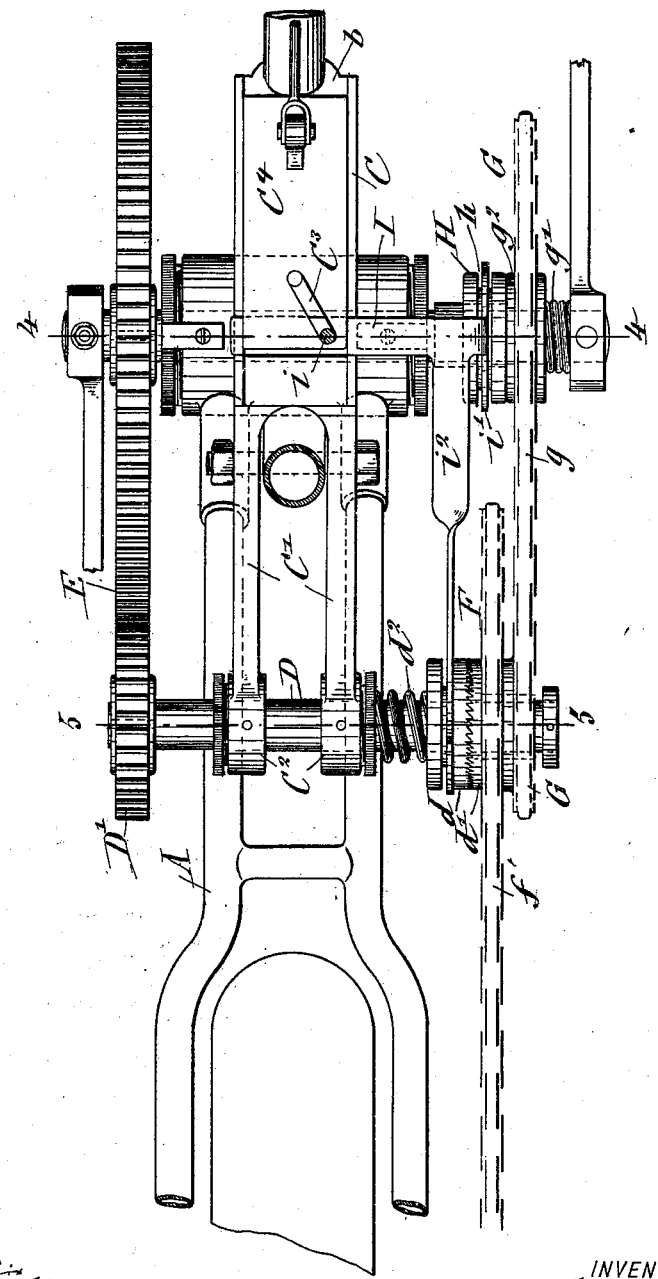

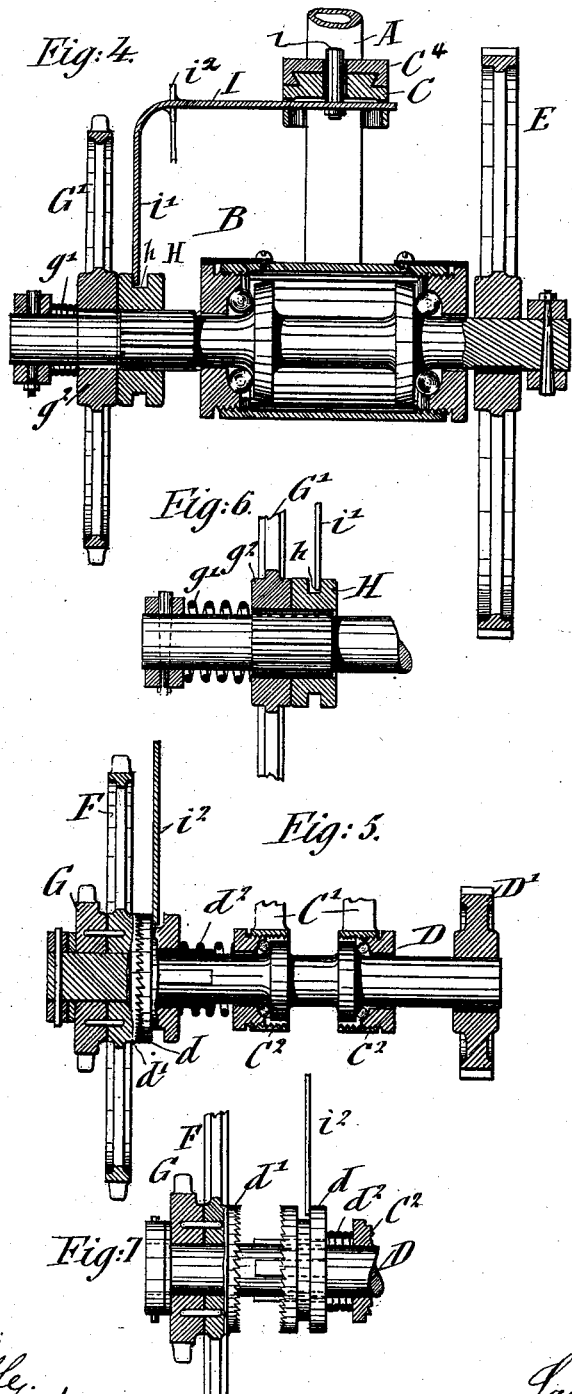

United States Patent Office.

LOUIS FEINGOLD, OF NEW YORK, N. Y.

ATTACHMENT FOR BICYCLES.

SPECIFICATION forming part of Letters Patent No. 603,326, dated May 3, 1898.

Application filed October 28, 1897. Serial No. 656,721. (No model.)

*To all whom it may concern:*

Be it known that I, LOUIS FEINGOLD, a citizen of the United States, residing in New York, county and State of New York, have invented certain new and useful Improvements in Attachments for Bicycles, of which the following is a specification.

This invention relates to bicycles, and has for its object to provide an attachment which may be applied to any style of bicycles for the purpose of enabling a rider to instantly check the forward movement of the bicycle and cause the same to move backward without reversing the direction in which the pedals normally rotate or resorting to back-pedaling, as is the usual practice with riders when endeavoring to check the progress of the wheel.

The invention consists of an attachment for bicycles constructed substantially as hereinafter described, and defined in the claims.

Referring to the drawings, Figure 1 is a view in elevation of a bicycle provided with my attachment. Fig. 2 is an enlarged view in elevation of my attachment, showing only a portion of the frame of the bicycle. Fig. 3 is a top view of the attachment, showing the parts in the position assumed when the bicycle is checked, the frame of the bicycle being partly in section. Fig. 4 is a section on the line 4 4 of Fig. 3. Fig. 5 is a section on the line 5 5 of Fig. 3. Figs. 6 and 7 are fragmental portions of Figs. 4 and 5, respectively, showing the position the parts assume when the bicycle is running free.

Similar letters of reference indicate corresponding parts.

Referring to the drawings, A represents a bicycle, which may be of any ordinary or preferred type.

B represents my improved attachment, which is adapted to be secured to the frame of the bicycle by means of a clip $b$, which is attached to the outer end of a bed-plate C. The bed-plate C extends rearwardly above the pedal-bearing and is forked about midway of its length, forming two arms C' C', which extend one on each side of the main fork of the frame of the bicycle and terminate in bearings $C^2$ $C^2$, in which the shaft D of the attachment is journaled. Upon one end of the shaft D is secured a pinion D', which meshes with a gear E, fixed on the pedal-shaft. The other end of the shaft D is provided with the two members $d$ $d'$ of a clutch mechanism upon the outer member $d'$ of which is secured a sprocket-wheel F, which is connected with the small sprocket $f$ of the rear wheel by a sprocket-chain $f'$. A spiral spring $d^2$ is sleeved on the shaft D and serves to force the member $d$ of the clutch mechanism into engagement with the coöperating member $d'$, which is loosely sleeved upon the shaft D. A small sprocket-wheel G is fixed upon the end of the clutch member $d'$ on the outside, but close to the sprocket-wheel F, so as to turn with the large sprocket-wheel F. The sprocket-wheel G is connected by the sprocket-chain $g$ with the driving sprocket-wheel G', which is fixed upon a hub $g^2$, loosely sleeved upon the pedal-shaft.

A spiral spring $g'$ is sleeved upon the pedal-shaft and bears upon the hub of the sprocket-wheel G' and the pedal-crank. The clutch member $d$ is splined upon the shaft D, so as to rotate with the same. A hub H is splined to the pedal-shaft and is provided with a groove $h$ upon its periphery. This hub H is adapted to slide longitudinally upon the pedal-shaft, but is forced to rotate therewith because of its splined connection with said shaft. The hub $g^2$ of the driving-sprocket G' is provided with a plurality of grooves upon its inner periphery, which are adapted to receive the splines upon the pedal-shaft, so as to be forced to rotate therewith when thrown into connection therewith.

The bed-plate C is suitably grooved upon its upper surface, in which is mounted a slide-bar $C^4$, which is provided with an inclined slot $C^3$ at its outer end. An operating-lever L is pivoted to a suitable support $l$ upon the front fork of the bicycle and is pivotally connected at its lower end to the rod $l'$, which is in turn pivotally connected with the slide-bar $C^4$, as shown in Fig. 1. A clutch-rod I is connected with the slide-bar $C^4$ by means of the pin $i$, which passes up through the inclined slot $C^3$ of the slide-bar $C^4$. The clutch-rod I extends transversely to one side of the slide-bar $C^4$ and is provided at its outer end with a downwardly-extending arm $i'$, which engages with the groove $h$ upon the periphery of the hub H. Near the outer end of the clutch-bar I is a second arm $i^2$, which extends parallel with the slide-bar $C^4$ and engages with the movable clutch member $d$ on the shaft D, as shown in Fig. 3.

When the parts are in the position shown in Fig. 3, the operation of the driving-pedals rotates the pedal-shaft and causes the gear E to rotate, driving the pinion D' in the opposite direction. The driving sprocket-wheel G', being at this time loose upon the pedal-shaft, performs no work. The shaft D, being driven by the pinion D', drives the sprocket-wheel F, the clutch members $d\ d'$ being in engagement, and the power is thus transmitted by means of the sprocket-chain $f$ to the rear wheel, causing it to rotate backward. Thus it will be seen that when the parts are in the position shown in Fig. 3 the forward motion of the pedals propels the bicycle backward instead of forward. By operating the lever L the slide-bar $C^4$ is forced backward, drawing to one side the clutch-bar I by means of the pin-and-slot connection between the said clutch-bar and the slide-bar $C^4$. This movement causes the hub H to move on the pedal-shaft away from the driving-sprocket G', which is immediately forced by the pressure of the spring $g'$ into engagement with the spline on the pedal-shaft, thus fixing the said driving-sprocket upon the pedal-shaft. At the same time the clutch member $d$ is disengaged from the clutch member $d'$, leaving the sprocket-wheel F loose upon the shaft D. When the parts are in position, the forward movement of the pedals rotates the pedal-shaft and with it the driving sprocket-wheel G', which is at this time splined to the said pedal-shaft. The rotation of the driving sprocket-wheel G' rotates the sprocket-wheel G through the connecting sprocket-chain $g$ and in turn rotates the sprocket-wheel F, which is fixed to the same hub as the sprocket-wheel G. Driving power is thus transmitted through the sprocket-chain $f'$ to the rear wheel, and the bicycle is propelled forward. The rotation of the pedal-shaft of course rotates the gear-wheel E, which in turn rotates the pinion D' and the shaft D, but by reason of the disengagement of the clutch members $d\ d'$ does no work, because the hub carrying the sprocket-wheels F and G is loose upon the said shaft D. It will thus be seen that the forward movement of the pedals propels the bicycle in either a forward or backward direction by simply operating the hand-lever L.

My improved attachment is simple in construction and effective in operation and can be readily applied to any bicycle without necessitating any changes or variations in the construction thereof.

Having thus described my invention, what I claim as new, and desire to secure by Letters Patent, is—

1. The combination with a bicycle, of an attachment consisting of a driving sprocket-wheel loosely mounted upon the pedal-shaft and adapted to be thrown into fixed engagement therewith, a gear-wheel upon said pedal-shaft, a bed-plate provided with bearings, a shaft journaled in said bearings, a pinion fixed upon said shaft meshing with said gear-wheel, a large and small sprocket-wheel fixed upon a hub loosely sleeved upon said shaft, a sprocket-chain connecting the driving sprocket-wheel with the said small sprocket-wheel, a sprocket-chain connecting the said large sprocket-wheel with the rear wheel of the bicycle, and means substantially as described whereby the driving-sprocket may be thrown into or out of fixed engagement with the pedal-shaft and whereby the large and small sprocket-wheels may be thrown into or out of fixed engagement with said shaft, substantially as set forth.

2. The combination with a bicycle, of an attachment consisting of a shaft geared to the pedal-shaft of the bicycle, a hub loosely sleeved upon said shaft and forming one member of a clutch mechanism, a large and small sprocket-wheel carried by said hub, a movable clutch member splined to said shaft and adapted to be thrown into and out of engagement with the clutch member carrying the sprocket-wheels, a driving sprocket-wheel loosely sleeved upon the pedal-shaft and adapted to be thrown into fixed engagement therewith, a sprocket-chain connecting the driving-sprocket with the said small sprocket-wheel, a sprocket-chain connecting the said large sprocket-wheel with the rear wheel, a hub splined to the pedal-shaft, means for operating said hub and said clutch mechanism, and a spring sleeved upon said pedal-shaft, whereby the said driving sprocket-wheel is thrown into engagement with the pedal-shaft, substantially as set forth.

3. The combination with a bicycle, of an attachment consisting of a bed-plate adapted to be secured to the frame of the bicycle and provided with forked arms having bearings at the extremities thereof, a shaft journaled in said bearings, a pinion fixed upon one end of said shaft, a clutch member loosely sleeved upon said shaft, a large and a small sprocket-wheel carried by said clutch member, a movable clutch member splined upon said shaft and adapted to be thrown into and out of engagement with the other clutch member, a gear fixed upon the pedal-shaft and meshing with the said pinion, a driving sprocket-wheel loosely mounted upon said pedal-shaft and provided with a grooved hub, a hub splined upon the pedal-shaft adapted to bear against one face of the hub of said driving sprocket-wheel, a spring coiled upon the said pedal-shaft and bearing against the other face of said hub whereby said driving sprocket-wheel is adapted to be thrown into engagement with the splines upon the pedal-shaft, a slide-bar carried by the said bed-plate and provided with an inclined slot, a clutch-bar provided with a pin adapted to engage the inclined slot of the slide-bar, a downwardly-extending arm adapted to engage the hub splined upon the pedal-shaft, an arm carried by said slide-bar and extending parallel therewith, and adapted to engage the movable member of the said clutch mechanism, a sprocket-chain connecting said driving sprocket-wheel with the said small sprocket-wheel, and a sprocket-chain connecting the said large sprocket-wheel with the rear wheel of the bicycle, and an operating-lever pivoted to the frame of the bicycle and to the said slide-bar, substantially as set forth.

In testimony that I claim the foregoing as my invention I have signed my name, in presence of two witnesses, this 21st day of September, 1897.

LOUIS FEINGOLD.

Witnesses:
MARCUS BERDINE,
H. PORNANSKY,